(No Model.)
J. RATH.
WASHER CUTTER.
No. 296,219. Patented Apr. 1, 1884.
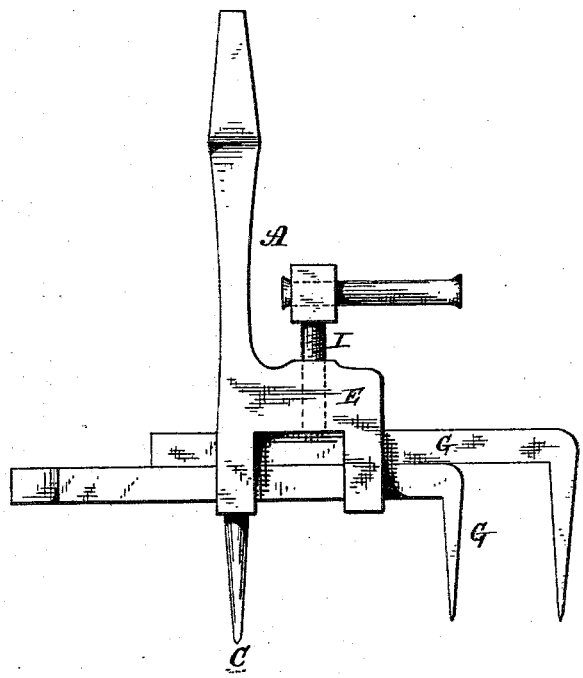
Witnesses
Louis F. Gardner
J. W. Garner
Inventor
Jos. Rath,
per
J. A. Lehmann,
Atty.

UNITED STATES PATENT OFFICE.

JOSEPH RATH, OF COLUMBUS, OHIO.

WASHER-CUTTER.

SPECIFICATION forming part of Letters Patent No. 296,219, dated April 1, 1884.

Application filed February 12, 1884. (No model.)

*To all whom it may concern:*

Be it known that I, JOSEPH RATH, of Columbus, in the county of Franklin and State of Ohio, have invented certain new and useful Improvements in Washer-Cutters; and I do hereby declare the following to be a full, clear, and exact description of the invention, such as will enable others skilled in the art to which it pertains to make and use the it, reference being had to the accompanying drawing, which forms part of this specification.

My invention relates to an improvement in washer-cutters; and it consists in the combination of the cutters, the frame in which they are held having an extended arm through which they pass, and a set-screw which passes through the arm for the purpose of clamping the cutters in position, as will be more fully described hereinafter.

The object of my invention is to so construct the frame in which the cutters are held that they will be provided with a double bearing for the purpose of preventing the cutters from slipping so as to follow the grain of the material being cut, as is the case where but a single bearing is made.

The accompanying drawing represents a side elevation of a washer-cutter embodying my invention complete.

A represents the standard or frame, which is adapted to have its upper end placed in a brace, so that it can be turned rapidly and freely around. Upon the lower end of this frame or standard, and in a line with the end which is to be attached to the brace, is formed the pivotal point C, which is forced down through the leather or other article being cut in the usual manner. Projecting from one side of this frame is the arm E, which, like the standard, has a horizontal opening made through it for the passage of the shanks of the cutters G. Both of these cutters are adjustable freely back and forth in the double bearings, which are formed for them, and are clamped rigidly in any desired position by means of the set-screw I, which is passed down through the arm, as shown.

Heretofore washer-cutters have been made which have but a single bearing for the cutters, and the consequence is the cutters are constantly liable to follow the grain of the leather or material which is being cut, owing to the fact that they cannot be rigidly held in place where only a single bearing is made. By forming two bearings and applying the pressure to the cutters midway between the two bearings, as here shown, the cutters can be clamped so tightly in place that they will not give in any direction, no matter upon what kind of material they are being used. After the cutters have been adjusted in their relative positions, it is only necessary to exert a slight pressure upon them, and they will be securely held in place.

For the purpose of giving an additional use to the implement, one of the shanks of the cutters is sharpened at its end, so as to form a screw-driver.

Having thus described my invention, I claim—

1. A washer-cutter having two separate bearings for each of the cutters, substantially as shown.

2. A washer-cutter having two separate bearings for each of the cutters, and a screw which is applied to the cutters midway between the bearings, substantially as set forth.

3. The combination of the shank provided with the arm or extension upon one side, with the cutters, and a screw for clamping the cutters in position, both the shank and the arm being perforated for the cutters to pass through laterally, substantially as described.

In testimony whereof I affix my signature in presence of two witnesses.

JOSEPH RATH.

Witnesses:
  R. B. SMITH,
  J. S. GOLD.